United States Patent [19]
Vincent

[11] Patent Number: 6,108,659
[45] Date of Patent: Aug. 22, 2000

[54] METHOD AND APPARATUS FOR EXECUTING STORED CODE OBJECTS IN A DATABASE

[75] Inventor: John K. Vincent, Richmond, Calif.

[73] Assignee: Computer Associates Think, Inc., Islandia, N.Y.

[21] Appl. No.: 09/219,253

[22] Filed: Dec. 22, 1998

[51] Int. Cl.$^7$ .................................................. G06F 17/30
[52] U.S. Cl. ............................. 707/101; 707/2; 395/704; 714/38
[58] Field of Search .................................. 707/1–4, 103, 707/200–206, 101–102; 395/701, 703, 704, 708; 714/38

[56] References Cited

U.S. PATENT DOCUMENTS

| | | | |
|---|---|---|---|
| 4,953,084 | 8/1990 | Meloy et al. | 364/200 |
| 5,226,162 | 7/1993 | Daw | 395/700 |
| 5,359,546 | 10/1994 | Hayes et al. | 364/579 |
| 5,361,351 | 11/1994 | Lenkov et al. | 395/700 |
| 5,495,571 | 2/1996 | Corrie, Jr. et al. | 395/183.14 |
| 5,519,859 | 5/1996 | Grace | 395/600 |
| 5,526,485 | 6/1996 | Brodsky | 395/183.14 |
| 5,561,763 | 10/1996 | Eto et al. | 395/183.11 |
| 5,655,073 | 8/1997 | Nishikado | 395/183.14 |
| 5,664,173 | 9/1997 | Fast | 395/604 |
| 5,675,730 | 10/1997 | Perdue et al. | 395/183.14 |
| 5,701,471 | 12/1997 | Subramanyam | 395/616 |
| 5,732,210 | 3/1998 | Buzbee | 395/183.14 |
| 5,761,510 | 6/1998 | Smith, Jr. et al. | 395/704 |
| 5,802,523 | 9/1998 | Jasuja et al. | 707/103 |
| 5,862,378 | 1/1999 | Wang et al. | 395/701 |
| 6,003,039 | 12/1999 | Barry et al. | 707/103 |

OTHER PUBLICATIONS

Paradigm Plus, Round–trip Engoneering with ERwin, Release 3.6, pp. 1–32, a Platinum Technology white paper Aug., 1998.

Paradigm Plus, Forward Engineering with Oracle8, Release 3.52, a Platinum Technology white paper, pp. 1–38, Nov. 1997.

Behrends, H., "Simulation–based Debugging of Active Databases" (Feb. 1994), IEEE Computer Society Press, Proceedings: Fourth International Workshop on Research Issues in Data Engineering: Active Database Systems, pp. 172–180.

(List continued on next page.)

*Primary Examiner*—Hosain T. Alam
*Attorney, Agent, or Firm*—Fliesler, Dubb, Meyer & Lovejoy LLP

[57] ABSTRACT

A system, method and database development tool are disclosed for automatically generating parameters for use in executing a stored code object in a data base, by parsing source code derived from existing data base code which represents the stored code object, wherein the parameters may represent complex data types.

6 Claims, 6 Drawing Sheets

OTHER PUBLICATIONS

Binks, D., "Declarative Debugging of Abstract Data Types in Godel" (May 1993), Automated and Algorithmic Debugging, First International Workshop, AADEBUG '93, pp. 188–205.

Bird, B., "An Open Systems SEE Query Language" (Apr. 1995), IEEE Computer Society Press, Proceedings: 1995 Software Engineering Environments, pp. 34–47.

Jard, C., et al., "An Approach to Testing Specifications" (1983), The Journal of Systems and Software 3, pp. 315–323.

Kim, H., et al., "A Class Testing Technique Based on Data Bindings" (Dec. 1996), IEEE Computer Society Press, Proceedings: 1996 Asia–Pacific Software Engineering Conference, pp. 104–109.

Katayama, T., et al., "Event Interactions Graph for Test-case Generation of Concurrent Programs" (Dec. 1995), IEEE Computer Society Press, Proceedings: 1995 Asia Pacific Software Engineering Conference, pp. 29–37.

Lee, Y., et al., "Debugging Logic Programs Using Specifications" (May 1993), Automated and Algorithmic Debugging, First International Workshop, AADEBUG '93, pp. 75–84.

McDonald, J., et al., "Translating Object–Z Specifications to Object–Oriented Test Oracles" (Dec. 1997), IEEE Computer Society, Proceedings: Asia Pacific Software Engineering Conference and International Computer Science Conference, pp. 414–422.

Oracle, "Oracle7™ Server Application Developer's Guide" (Dec. 1992), pp. i–xxiii; Chapter 1, "The Application Developer", pp. 1–1 thru 1–8.

Oracle, "PL/SQL™ User's Guide and Reference" Release 2.2 (Mar. 1995) Chapter 8, "Execution Environments", pp. 8–1 thru 8–26.

Oracle, "SQL*Plus® User's Guide and Reference", Ver. 3.1 (1992), p. 6–45.

Parson, D., et al., "A Tel–based Self–configuring Embebbed System Debugger" (Jul. 1997), USENIX Association, Fifth Annual Tel/Tk Workshop '97, pp. 131–138.

Rosenblum, D., "Specifying Concurrent Systems with TSL" (May 1991), IEEE Software, pp. 52–61.

METHOD AND APPARATUS FOR EXECUTING STORED CODE OBJECTS IN A DATABASE

TECHNICAL FIELD

This invention relates to the field of computer related systems and methods. More specifically, the invention is a system and method for automatically generating parametric data for use in executing code objects in a data base.

BACKGROUND ART

It is desirable to provide efficient and cost effective means for generating code for executing a stored code object in a data base. Such stored code objects must be executed for testing the object, determining the code coverage of the object, profiling the object, debugging the object, and for other similar reasons. Generating code used for testing, profiling, debugging, etc. such an object in most data base systems is highly expensive and inefficient in that it is time consuming and highly error-prone. For example, in an Oracle™ data base system using a PL/SQL™ query a stored code object or subprogram can be executed in one of two ways:

1) Use an Application programming interface such as Oracle Call Interface (OCI) that handles binding of parameters in addition to allowing the capability to execute an anonymous block that calls the subprogram; and 2) Use a PL/SQL development tool to construct an anonymous block that calls the subprogram.

Using an application programming interface to write a program that executes a subprogram object is very time consuming and is not a practical alternative to execute subprograms. Constructing an anonymous block that calls the subprogram can also be very time consuming. SQL*Plus™ provides an 'Execute' command that allows users to execute subprograms. To bind parameters, SQL*Plus provides the command 'Variable'. Using a combination of these two commands, a PL/SQL developer can execute subprograms. However, the SQL*Plus execution facility has only very limited use because of the following issues: (SQL*Plus and ORACLE and ORACLE7 are trademarks of ORACLE Corporation).

1) The 'Execute' command cannot be used to execute code objects that have complex parameter types in such PL/SQL records and PL/SQL table of records. Oracle7™ application programming interfaces do not support binding complex parameter types and so any implementations based on binding parameters will be limited by the fact that it will not be able to support complex parameter types.

2) Executing a code object with a number of parameters involves writing many, many 'Variable' commands which is very time consuming.

In the past, many attempts have been made to automate data base testing and debugging. One such attempt was to use a compiler to store modified debug information and to construct debug tables to determine the actual data types of objects, as described in U.S. Pat. No. 5,361,351 titled "System & Method for supporting run-time data type identification of objects within a computer program." Another such attempt is described in U.S. Pat. No. 5,519,859 titled "Method & Apparatus for Automatic table selection and generation of structured query language instructions," which describes a system of automatically generating structured query language statements from data in predefined data tables and automatically selected output tables. In both of these cases an inordinate amount of time and effort is devoted to preparing and developing the data tables and compiler developed tables. Many other U.S. patents describe various debugging and testing systems for data bases but none of these which is known to Applicant provides the method and system of the present invention for automatically generating the parameters necessary to execute such a subprogram.

It would be advantageous to have a method for executing subprograms that allows programmers to input the values of the parameters and display the values of the output parameters after the subprogram executes. The method of generating and executing anonymous blocks automatically should eliminate coding errors while declaring parameter data types in the anonymous blocks, at the same time initializing values for the declared parameters. The method should also allow for executing subprograms that take complex user defined types as parameters, a task which is very laborious and error prone to do in a manual fashion. A complete execution facility should facilitate thorough testing of code objects during development. This should in turn save money by reducing logical errors when these code objects are later deployed and executed in production environments through client programs.

The present invention addresses these issues through a framework to provide a complete execution facility that can be used to execute a code object. It generates an executable anonymous block automatically by avoiding binding parameters altogether. Instead, variables corresponding to the parameter types are declared and initialized in the anonymous block. After the code object is called, the variables that correspond to the parameters that are bound by reference contain the values that are returned by the subprogram. The variable declarations and initializations are accomplished through a combination of parsing the source code, looking up the parameter information stored about the subprogram in the catalog and using a wizard to get the parameter values.

DISCLOSURE OF THE INVENTION

A system, method and database development tool are disclosed for automatically generating parameters for use in executing a stored code object in a data base, by parsing source code derived from existing data base code which represents the stored code object, wherein the parameters may represent complex data types.

Also a method for generating an executable anonymous block for executing a subprogram in an Oracle database is claimed. Additionally claimed are a method for executing subprograms in an Oracle data base using anonymous blocks which themselves use parameter values that have been extracted from the subprogram to be executed, and a method for generating valid declaration statements of a subprogram in an Oracle data base. Also claimed is a system for developing database programs comprizing a computer system and a program code mechanism for automatically generating PL/SQL code by parsing source code derived from existing code residing in the data base.

Other embodiments of the present invention will become readily apparent to those skilled in these arts from the following detailed description, wherein is shown and described only the embodiments of the invention by way of illustration of the best mode known at this time for carrying out the invention. The invention is capable of other and different embodiments some of which may be described for illustrative purposes, and several of the details are capable of modification in various obvious respects, all without departing from the spirit and scope of the present invention. dr

BRIEF DESCRIPTION OF THE DRAWINGS

The features and advantages of the system and method of the present invention will be apparent from the following description in which.

BEST MODE FOR CARRYING OUT THE INVENTION

Figure 1:
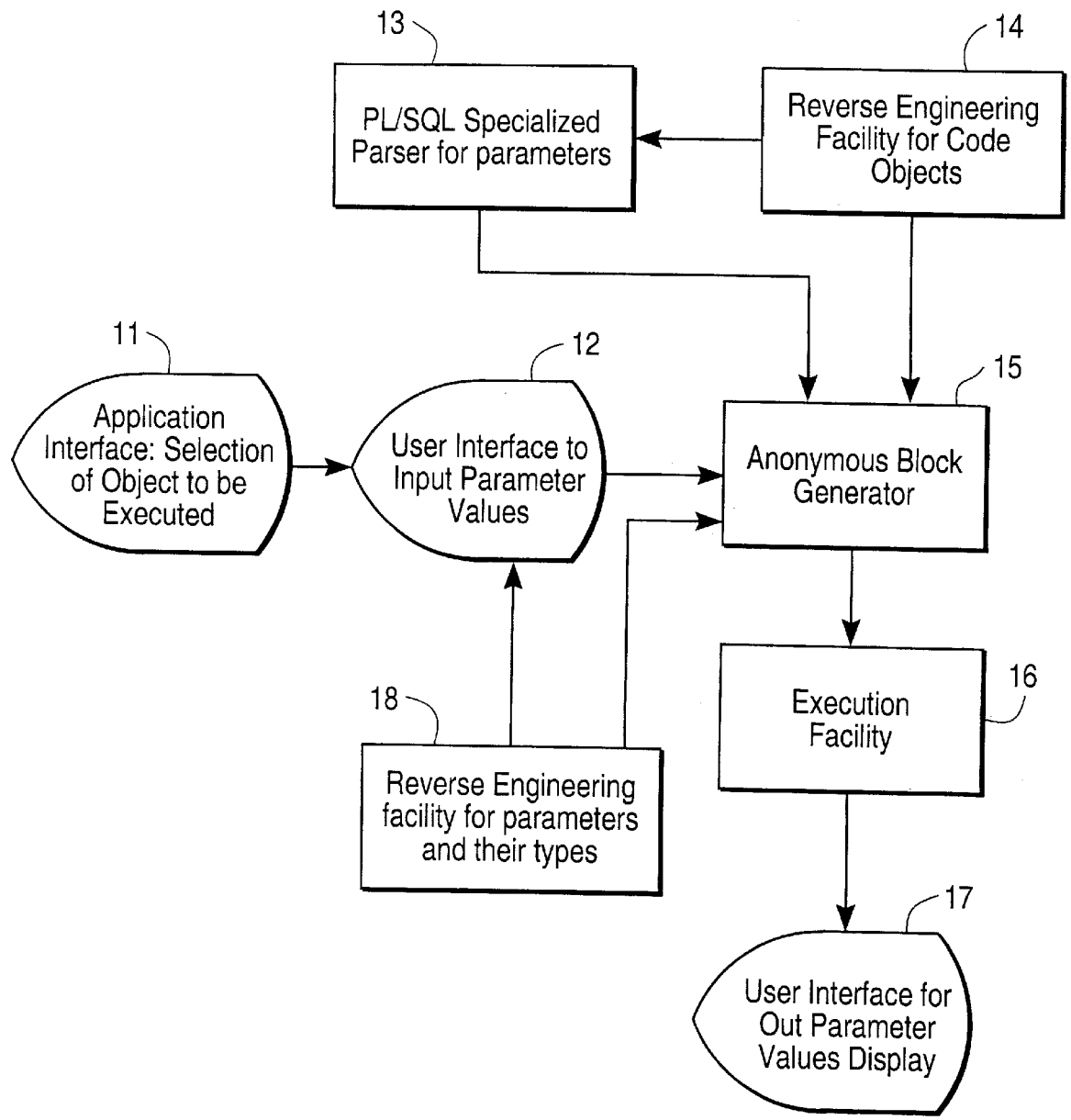
FIG. 1 illustrates a flow chart of the overall flow of a preferred embodiment of the present invention.

The present invention provides a method and apparatus for executing a subprogram in a database. The ability to execute a subprogram is a fundamental requirement for a developer. This allows verifying the logic of code objects as they is being developed.

In the following description for purposes of explanation, specific data and configurations are set forth in order to provide a thorough understanding of the present invention. In the presently preferred embodiment the invention is described in terms of an Oracle Integrated development Environment (IDE). However, it will be apparent to one skilled in these arts that the present invention may be practiced without the specific details, in various Data Base systems such as Oracle, Sybase, DB2, Informix, etc. In other instances, well-known systems and protocols are shown and described in diagrammatical or block diagram form in order not to obscure the present invention unnecessarily.

ADDITIONAL BACKGROUND INFORMATION

PL/SQL is programming language available in Oracle7 servers. It is a procedural extension of the standard SQL language. SQL stands for Structured Query Language which is a standard query language designed to write queries against Relational Databases. PL/SQL as implemented in Oracle7 databases is a procedural language geared towards implementing rules and other business logic in the database server. In a procedural programming language, logic for a program is typically implemented as subprograms. In PL/SQL, subprograms take the form of one of the following:

1) A PL/SQL stored procedure, which is a routine that can take input parameters and return output parameters';
2) A PL/SQL stored function, which is a routine that can take input parameters and return output parameters. In addition stored functions can be used in an expression and returns a value of a particular type declared in the specification;
3) A PL/SQL stored package, which is a collection of stored functions and procedures identified as a single named entity;
4) A PL/SQL stored trigger, which is a routine that gets executed automatically, when a data manipulation statement is executed in the database server; and
5) An anonymous PL/SQL block, which is an unnamed set of PL/SQL statements that can be executed on the server.

Once deployed, the named routines reside in the database server and can be executed. An anonymous block on the other hand is executed immediately and is not stored in the database server.

A parameter for a subprogram is a named storage location capable of containing a certain type of data that can be read and modified during execution of the subprogram. The rules governing whether a parameter can be read or modified is specified in Oracle through the use of parameter modes. The parameter mode 'IN' specifies that the parameter can be read but not modified, 'OUT' specifies that the parameter can be read but cannot be modified and 'IN OUT' specifies that the parameter can be read and modified. Each parameter has a data type, which specifies the possible range of values for the parameter, the operations that can be performed on the values and the way in which the values are stored.

PL/SQL supports a standard set of scalar data types. In addition, PL/SQL also supports a set of user defined data types. User defined types can be based on the data definition of a particular database table or can be based on a user defined type definition. User defined type definitions can be a composite of the basic scalar data types and can also have an unlimited number of nesting.

During development of subprograms, it is important for PL/SQL programmers to be able to execute the object to see how the function behaves when given different parameter values for the input parameters. Even when the logic is correct, the object might behave incorrectly when an invalid set of parameters is passed in. Subprogram execution based on different parameter values are necessary to detect coding errors during development.

In order to execute a subprogram, the caller needs to know about all the parameters and the associated data types. This knowledge is required independent of whether:

1) an anonymous block is constructed to execute the procedure; or
2) a program that executes the subprogram is written using an Oracle Application Programmer Interface.

Using either of these methods to execute a subprogram is a time-consuming task. The former method involves doing a couple of time consuming and error-prone tasks 1) Constructing an anonymous block that has the correct data type declarations for the parameters; and
2) Initializing the parameters manually with a set of valid parameter values.

The latter method involves debugging and testing a new program just to execute a subprogram.

OPERATING ENVIRONMENT

Figure 6:
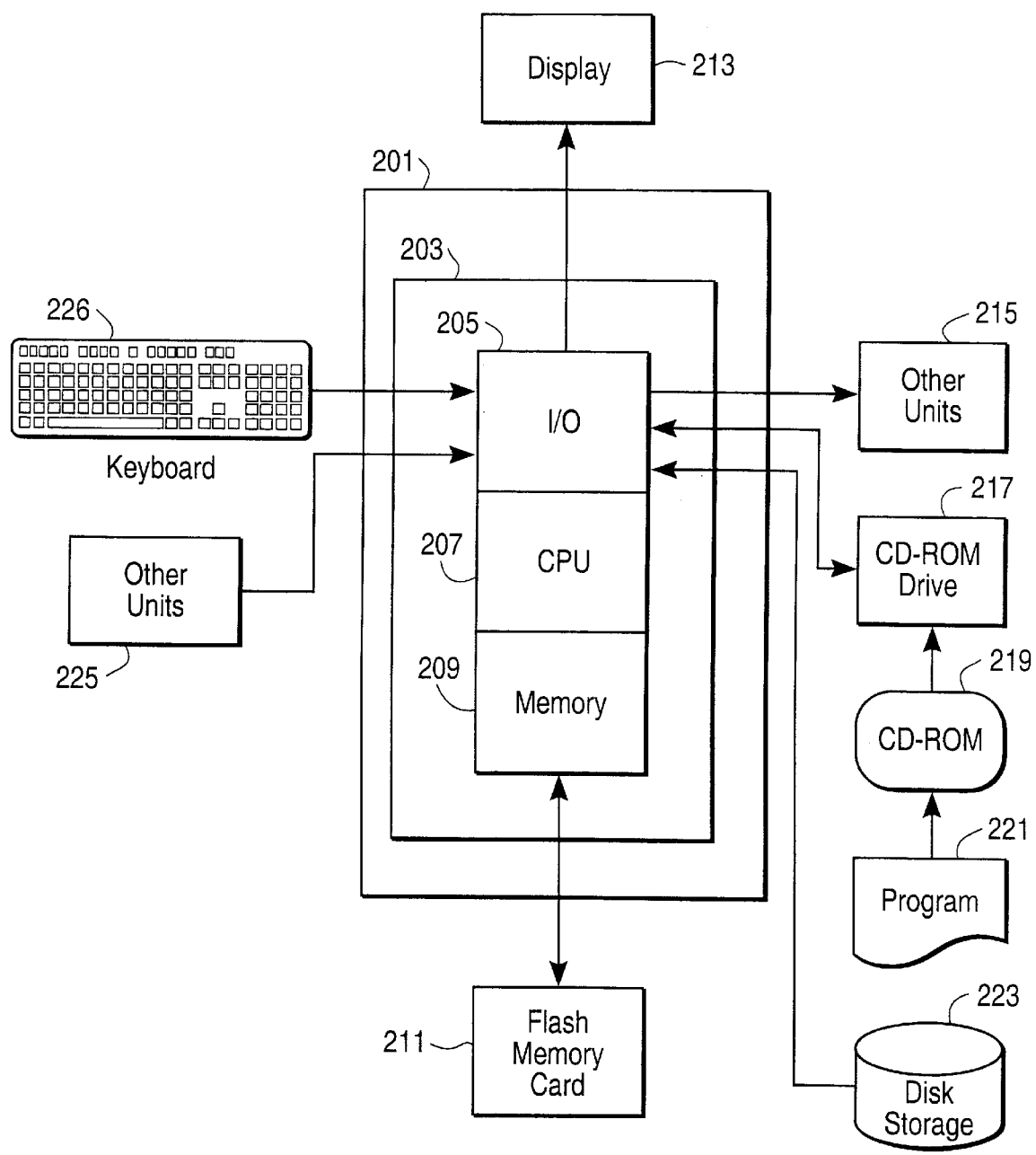
FIG. 6 illustrates a representative general purpose computer configuration useable as either a client PC and/or a server in the preferred embodiment of the present invention.

The present invention operates in and as a part of a general purpose computer unit which may include generally some or all of the elements shown in FIG. 6, wherein the general purpose system 201 includes a motherboard 203 having thereon an input/output ("I/O") section 205, one or more central processing units ("CPU") 207, and a memory section 209 which may have a flash memory card 211 related to it. The I/O section 205 is connected to a keyboard 226, other similar general purpose computer units 225, 215, a disk storage unit 223 and a CD-ROM drive unit 217. The CD-ROM drive unit 217 can read a CD-ROM medium 219 which typically contains programs 221 and other data. Logic circuits or other components of these programmed computers will perform series of specifically identified operations dictated by computer programs as described more fully below.

THE PREFERRED EMBODIMENT

The present invention provides a method and apparatus for executing a subprogram in a database. In a preferred embodiment, the method takes the values of input parameters, executes the code object and displays the values of the output parameters. A selected code object, a user interface that allows inputting parameter values of the selected code object and a user interface to display the values of the output parameters are used in the process. The selected code object provides the information required to reverse engineer the source code corresponding to the object. The source code is then passed to a specialized parser that extracts complex parameter declarations out of the source code. Information about the parameter name, type and storage length are all reverse engineered from the Oracle catalog. The parameter information from the catalog and the declaration statement parsed out of the source code is in turn used to construct variable declaration statements and variable initialization statements. The parameter information from the catalog is sufficient to construct declaration statements for scalar data types. However, for complex data types the actual declaration needs to be duplicated. This process allows bypassing of the explicit binding of parameters to values, a process that is not completely implemented for complex types. The anonymous block generation is completed by constructing the string to make the actual call to execute the subprogram. To display the output variable values a set of printing routines based on the DBMS_OUTPUT Oracle system package is appended after the call to the subprogram. The anonymous block generated is then executed and the DBMS_OUTPUT messages that output parameter values are displayed.

An Anonymous Block is an unnamed block of PL/SQL code that can be executed on the server. Anonymous blocks are compiled and executed in a single operation as opposed to named blocks which are compiled and executed in two distinct operations. To execute a subprogram in PL/SQL, one has to construct an anonymous block that calls the subprogram. The call to the subprogram involves passing in parameter values. A parameter is a named variable that can be associated with a value. The subprogram can then access these parameters as variables within the source code. Each parameter has a parameter name, a parameter type and a parameter mode. A parameter name is an identifier given to the parameter. A parameter type defines the set of data that specifies the range of values that a parameter can assume. The parameter type can be either scalar or complex. Examples of scalar parameter types include NUMBER and VARCHAIC2. Examples of complex parameter types include RECORDS and RECORDS of PL/SQL tables. A RECORD is a PL/SQL data type that is a composite of scalar types. RECORDS can be nested in the sense that you can have RECORDS that contain other RECORDS. A parameter mode defines the behavior of the parameters. The three parameter modes, IN, OUT and IN OUT, can be used with any subprogram. An IN parameter allows you to pass values to the subprogram being called. Inside the subprogram, the IN parameter acts as a constant and so cannot be assigned a value. An OUT parameter allows you to return values to the caller. Inside the subprogram, the OUT parameter acts as an uninitialized variable and so cannot be read. An IN OUT parameter allows you to pass values into the subprogram and return modified values back. Inside the subprogram, the IN OUT parameter acts as an initialized variable and so can be read and modified. FIG. 1 is a block diagram of the present invention in a preferred embodiment. The user interface component 11 gets the subprogram to be executed. The user interface component 12 gets the parameter values that was inputted. Component 18 is a module that issues the query that gets the parameter name, type, mode etc. The module then builds the list of parameters in memory. The list is used to construct the user interface component 12. After gathering the parameter value information, component 15 constructs the anonymous block using output from the components 13 and 14.

To construct an anonymous block that executes the subprogram, the present invention receives the following inputs in the preferred embodiment:

1) The subprogram name and location within the database (component 11 in FIG. 1); and
2) The parameter values for the selected subprogram (component 12 in FIG. 1).

The present invention generates a template for entering parameter values based on the subprogram selected and prompts for the values of the individual parameters. To do this, component 18 in FIG. 1, queries the database catalog to identify the parameter types and the subtypes of each parameter. The following Oracle query against the Oracle catalog gives this information for a stored procedure. Similar queries can be written to extract this information for a stored function, a stored package procedure or a stored package function: SELECT u.name, o.name, a.argument, a.sequence#, a.overload#, a.position, a.type,

---

DECODE(DECODE(a.type,29,3,69,11,a.type),0,'No Parameters',
    1,'VARCHAR2',2,'NUMBER',3,'NATIVE INTEGER',
    8,'LONG',11,'ROWID',12,'DATE',23,'RAW',
    24,'LONG RAW',96,'CHAR',106,'MLSLABEL',105,'MSLABEL',
    250,'RECORD',251,'TABLE',252,'BOOLEAN'),
DECODE(NVL(a.default#,0),I,'YES','NO')DEFAULT#,
NVL(a.in_Out,0),
NVL(a.level#,0),
    NVL(a.length,0),
    NVL(a.precision,0),
    NVL(a.scale,0),
NVL(a.radix,0),decode(o.status,1,1,0),
    bitand(b.options,4)
FROM sys.argument$ a,sys.obj$ o,sys.user$ u,sys.procedure$ b
WHERE a.OBJ#(+)=o.obj#
and o.obj#=b.obj#
AND o.owner#=u.user#
and o.linkname is null
and o.type =7
and
(
o.owner#in (uid, 1 /* PUBLIC */)
or
(o.obj#in (select obj# from sys.objauth$
    where grantee# in (select kzsrorol from ptsql_auth)
    and privilege#=12) /* EXECUTE */
)
or
(exists (select null from sys.v_$enabledprivs
  where priv_number in (-144 /* EXECUTE ANY PROCEDURE */,
    -142, -143, -141 /*CREATE ANY PROCEDURE */)
  )
  )
)

---

In the preferred embodiment, the present invention constructs a list of parameters and its associated types in memory. The list is singly nested for complex parameter types whose components are all scalars. There is a plurality of nesting in this list in the case of complex parameter types that are nested. This list is used to generate the template for getting the input parameter values. This mechanism allows error detection while inputting these values—the values have to conform to the range of values specified by the type of the parameter.

FIGS. 2 through 5 comprise the flow charts which depict the steps used to generate the anonymous block. Components 21 and 22 illustrate the construction of the list of parameters in memory. The list obtained as output from these modules is used by the User Interface Component to input parameters (component 12 in FIG. 1) as well as by the anonymous block generation component.

Figure 2:
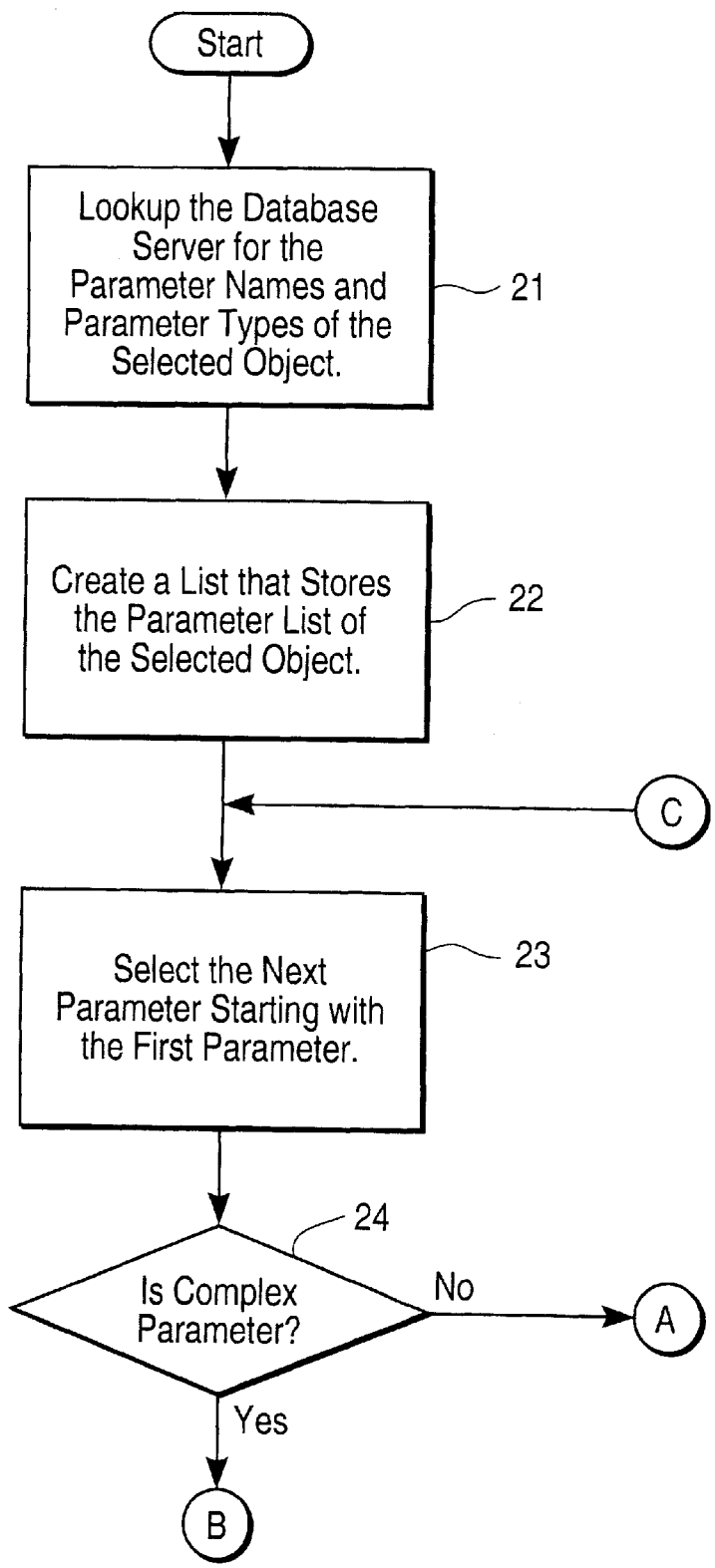
FIG. 2 illustrates a flow chart showing the construction of a list of parameters.
Figure 3:
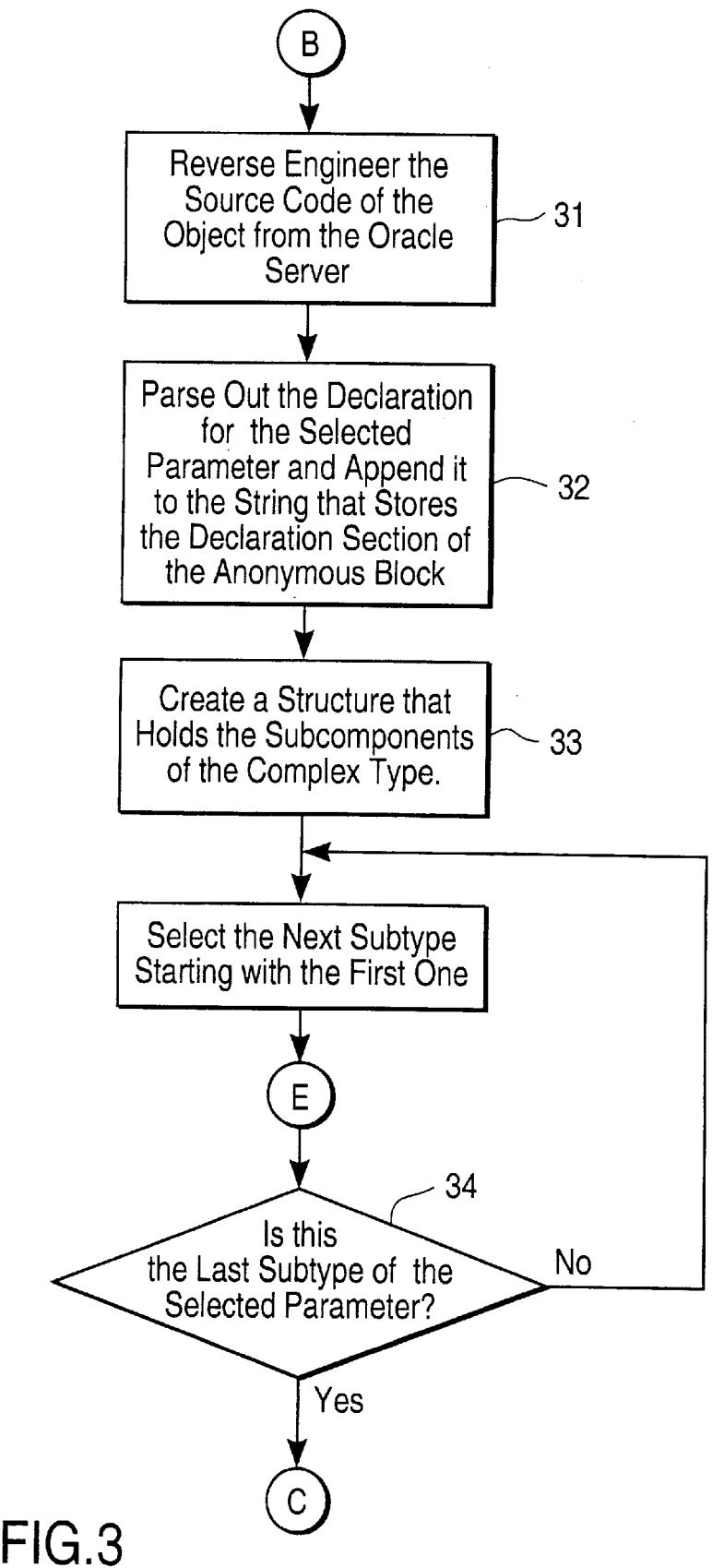
FIG. 3 illustrates a flow chart showing the steps used to construct a complex parameter declaration.
Figure 4:
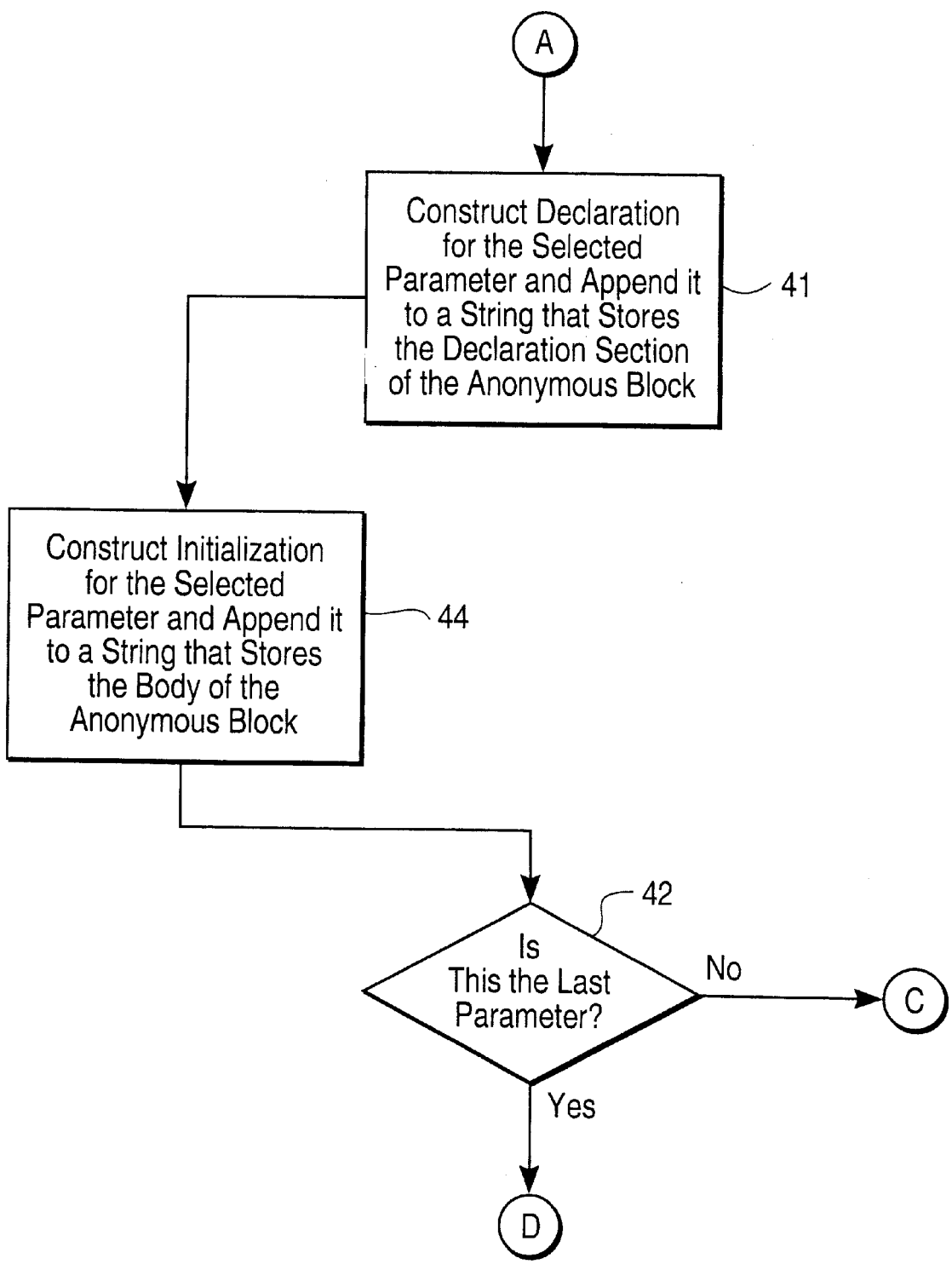
FIG. 4 illustrates a flow chart showing the declaration construction steps in the preferred embodiment.
Figure 5:
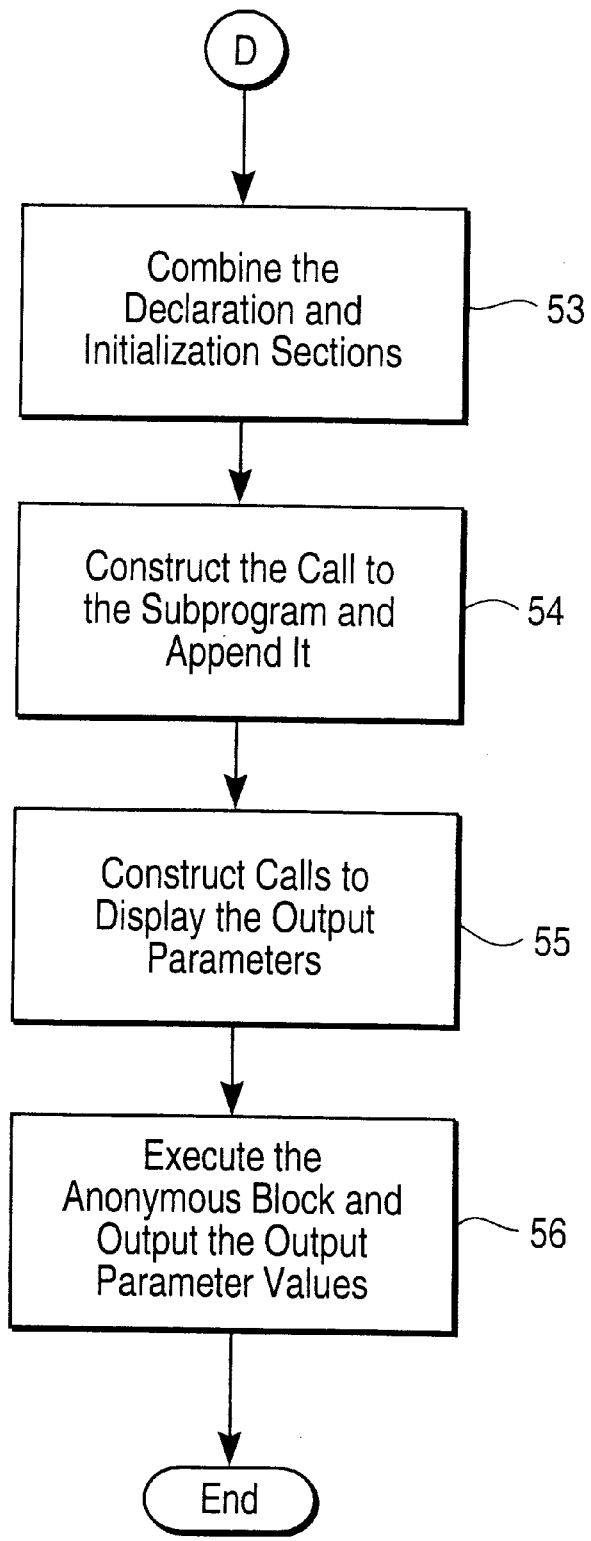
FIG. 5 illustrates a flow chart of the steps used to construct an anonymous block in the preferred embodiment.

The present invention then scans the list (component 23 in FIG. 2) starting with the first item. Component 24 in FIG. 2 checks whether the item is a complex parameter. If it is a complex parameter, the flowchart in FIG. 3 illustrates the anonymous block construction steps that declare and initialize a complex parameter. Otherwise, the flowchart in FIG. 4 illustrates the steps that declare and initialize a scalar parameter. The steps starting in component 23 in FIG. 2 are repeated for every parameter to construct a string that declare and initialize all parameters of the subprogram. After the declaration and initialization of parameters is completed, the flow chart in FIG. 5 illustrates the steps the present invention uses to complete the construction of the anonymous block. Once the anonymous block is constructed, it is executed on the server and the output parameters are outputted.

The present invention keeps two strings to construct the declaration and initialization sections of the anonymous block. To declare a complex parameter, the present invention first reverse engineers the source code of the object from the Oracle server (component 31 in FIG. 3). It then parses the source code to extract the string that declares the complex parameter (component 32 in FIG. 3). A standard searching algorithm or a simple state diagram based parser may be used for this purpose. The string parsed out is then modified to make it a variable declaration statement as opposed to a parameter declaration statement. The resulting string is appended to the string that stores the declaration section of the anonymous block.

After constructing the string for the declaration of the complex type, the present invention accesses the nested list that holds the parameters of the subprogram to get the list that holds the sub components of the complex type (component 33 in FIG. 3). It then scans the list starting with the first scalar sub component of the complex parameter. For each scalar sub component, an initialization statement is then constructed using the value inputted in component 12 in FIG. 1. The initialization statement is then appended to the string that holds the initialization section of the anonymous block (component 44 in FIG. 4).

For a parameter with a scalar type, the present invention constructs the declaration of the parameter in component 41 in FIG. 4. The parameter information retrieved from the Oracle catalog (component 18 in FIG. 1) is used for the purpose. The present invention then constructs the initialization statement using the component 44 in FIG. 4.

Once the declaration and initialization sections of the anonymous block are completed, the present invention combines the initialization and declarations sections to form a string that holds a partial block of PL/SQL code.

The present invention then constructs the code to execute the subprogram using the subprogram name from component 11 in FIG. 1 and the parameter names from component 18 in FIG. 1. The string is then appended to the string that contains the partial anonymous block constructed in component 43 in FIG. 4.

The present invention then constructs the calls to output the values of the output parameters. The process of scanning the list of parameters is again applied for the purpose. For each scalar parameter, check whether it is an output parameter and if it is append the call to output the value. For a complex parameter, apply the recursive process of scanning the sub components. Then construct a single call to do a formatted output of the subcomponents of the parameter.

Following is an example of an anonymous block generated in the preferred embodiment for a stored procedure:

A stored procedure 'foo' has two parameters. The first parameter 'scalar1' is a scalar IN parameter of type VARCHAR2. The second parameter 'record1' is a complex parameter of type 'tab1%TYPE', where the table 'tab1' has two columns, the first column 'col1' of type VARCHAR2 (30) and the second column 'col2' of type NUMBER. The anonymous block generated by applying the procedure above will be:

1. declare;
2. scalar1 varchar2(2000);
3. record1 tab 1%TYPE;
4. begin;
5. scalar1:='input 1';
6. record1.col1:='input2';
7. record1.col2:=input3;
8. foo(scalar1, record1);
9. dbms_output.put_line(record1.col1 ||',' || record1.col2);
11. end;

Line 2 above is constructed by using the parameter list constructed in component 18 of FIG. 1. Line 3 above is constructed by parsing out the declaration out of the source code using the process in component 32 in FIG. 3. Lines 5 through 7 is constructed using the process illustrated in FIG. 4. Line 8 is constructed by using the parameter names stored in the parameter list, Line 9 which output the OUT parameters is constructed by scanning the parameter list and checking whether they are OUT parameters. Note that other Relational Data Base Management Systems (RDBMS) may refer to read only, write only and read/write constraints by other terms.

Additional background information specific to the Oracle Data Base, PL/SQL and SQL*Plus can be found in the following references which are hereby incorporated fully herein by reference:

1. SQL *Plus User's Guide and Reference Release 3.1 p 6–45.
2. PL/SQL User's Guide and Reference Release 2.2 Chapter 8.
3. Oracle 7 Application Developer's Guide Release 7.3.

Having described the invention in terms of a preferred embodiment, it will be recognized by those skilled in the art that various types of general purpose computer hardware may be substituted for the configuration described above to achieve an equivalent result. Similarly, it will be appreciated that arithmetic logic circuits are configured to perform each required means in the claims for processing parametric input to automatically generate the required calls to execute a stored data object. It will be apparent to those skilled in the art that modifications and variations of the preferred embodiment are possible, which fall within the true spirit and scope of the invention as measured by the following claims.

What is claimed is:

1. A method for generating an executable anonymous block that can be used to execute a subprogram in an Oracle database, using a computer which has at least a processor, memory, display, input/output devices and connectivity software to connect to the Oracle server, the method comprising the steps of:

a) selecting a subprogram from an Oracle catalog;
   b) getting source code for the subprogram by reverse engineering the subprogram;

c) parsing the source code to extract a declaration of parameters from the source code; and d) generating an executable anonymous block using parameter values indicated by the declaration of parameters.

2. The method of claim 1 wherein the executable anonymous block can be used to execute a subprogram in an Oracle database as part of a PL/SQL testing tool.

3. The method of claim 1 wherein the executable anonymous block can be used to execute a subprogram in an Oracle database as part of a PL/SQL code coverage tool.

4. The method of claim 1 wherein the executable anonymous block can be used to execute a subprogram in an Oracle database as part of a PL/SQL profiling tool.

5. The method of claim 1 wherein the executable anonymous block can be used to execute a subprogram in an Oracle database as part of a PL/SQL debugger.

6. A method of generating valid declaration statements of an Oracle subprogram in an Oracle database, using a computer which has at least a processor, memory, display, input/output devices and connectivity software to connect to the Oracle server, the method comprising the steps of:

a) providing a database development tool configured to be used to develop PL/SQL code against an Oracle database server;

b) reverse engineering source code of a subprogram from an oracle catalog;

c) parsing the source code for a parameter declaration and then modifying the declaration to make it a valid variable declaration statement; and d) using the variable declaration statement to develop the PL/SQL code.

* * * * *